A. L. FORREST.
NON-SLIPPING ATTACHMENT FOR VEHICLE WHEELS.
APPLICATION FILED DEC. 13, 1919.
1,365,903.
Patented Jan. 18, 1921.
2 SHEETS—SHEET 1.
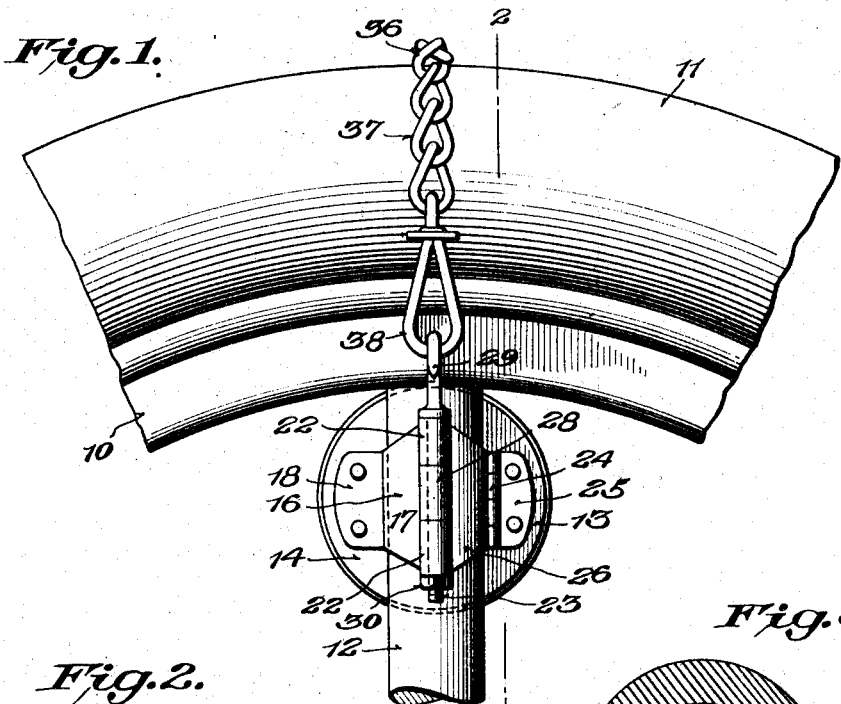
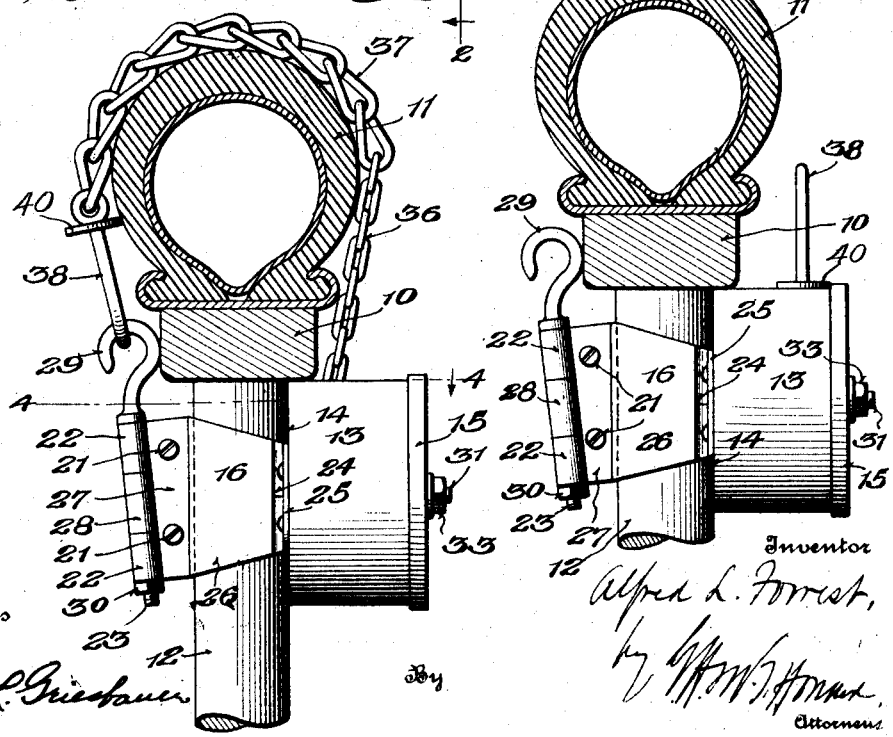

A. L. FORREST.
NON-SLIPPING ATTACHMENT FOR VEHICLE WHEELS.
APPLICATION FILED DEC. 13, 1919.
1,365,903.
Patented Jan. 18, 1921.
2 SHEETS—SHEET 2.
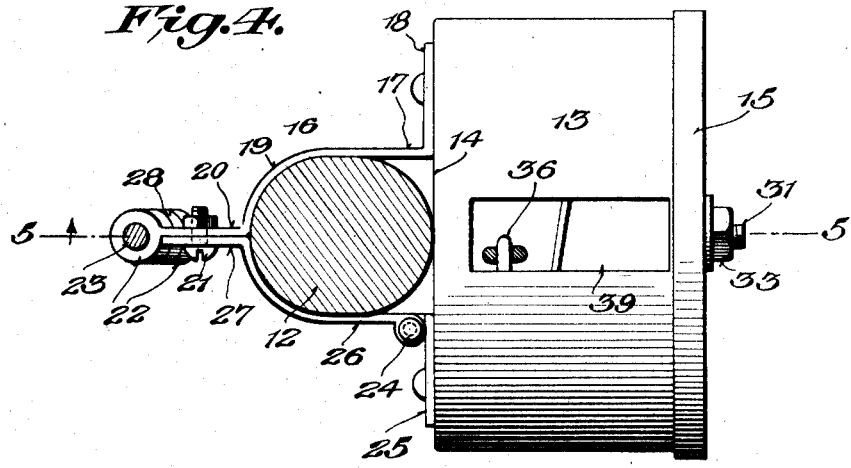
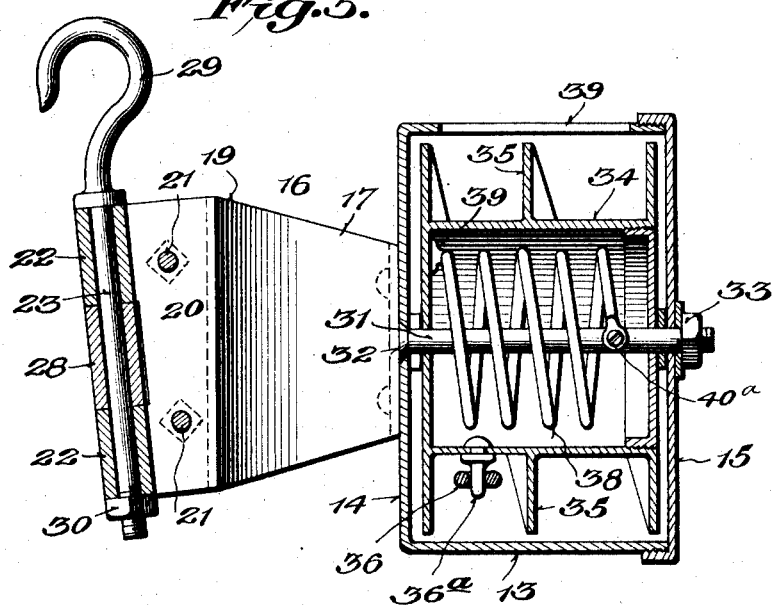

UNITED STATES PATENT OFFICE.

ALFRED L. FORREST, OF BALTIMORE, MARYLAND.

NON-SLIPPING ATTACHMENT FOR VEHICLE-WHEELS.

1,365,903. Specification of Letters Patent. Patented Jan. 18, 1921.

Application filed December 13, 1919. Serial No. 344,701.

*To all whom it may concern:*

Be it known that I, ALFRED L. FORREST, a subject of the King of Great Britain, residing at Baltimore and State of Maryland, have invented new and useful Improvements in Non-Slipping Attachments for Vehicle-Wheels, of which the following is a specification.

This invention, broadly considered, relates to traction devices for vehicle wheels, and particularly to what are known as non-skid chains which are applied to the tires of automobile wheels when running on slippery or muddy roads to insure the vehicle against slipping or skidding when turning a curve or traveling on inclined roads, and to prevent the racing of the motor through lack of sufficient traction between the tire and the road.

More especially the invention relates to securing to each of a plurality of spokes of one or more wheels of the vehicle, and close to the felly, a spring-actuated drum, and fastening thereto a traction chain which, when not in use, will be wound upon the drum, and may be drawn across the tread surface of the tire and secured to a hook carried on the spoke, such action winding the spring of the drum so that when the chain is released from the hook, it automatically will be rewound about the drum and held out of action.

With the above objects in view, the invention consists in the novel constructions, combinations and arrangements of parts set forth in the following description, and particularly pointed out in the claims, reference being had to the accompanying drawings, in which—

Figure 1 is a side elevation of a portion of an automobile wheel with one of my improved traction or anti-skid chains in position for use thereon. Fig. 2 is a cross sectional view through the rim of the wheel on the line 2—2, Fig. 1, looking in the direction of the arrow. Fig. 3 is a similar sectional view of the wheel with the chain in its retracted or inoperative position. Fig. 4 is a section on the line 4—4 of Fig. 2, looking toward the hub of the wheel, and Fig. 5 a central sectional view of the chain holding device on the line 5—5 of Fig. 4.

In the drawings, 10 indicates the rim or felly of a vehicle wheel, particularly an automobile wheel provided with an ordinary pneumatic tire 11. 12 represents one of the spokes of the wheel, to each of which (or to as many as may be desired), is fastened at the outer end thereof a metal casing 13 resting in contact with the rim 10. The casing 13 is preferably cylindrical, it having a closed head 14 bearing against the spoke 12, and a removable head 15, formed with an interiorly threaded flanged edge, the head 15 thus being capable of ready attachment to and detachment from the casing 13. Riveted to the fixed head 14 of the casing 13 is a two-part yoke 16 of such shape as to embrace a spoke 12, and bear firmly thereon for holding the casing rigidly in position. One part 17 of the yoke has a foot piece 18 through which the securing rivets pass, a rigid outwardly projecting arm having a curved portion 19 to closely embrace the spoke, and a terminating plate 20 provided with two or more holes for fastening bolts 21. Formed on the outer edge of the plate 20 are a plurality of sleeves 22—preferably two—spaced apart and adapted to receive a through pin 23. The other element of the yoke 16 is made in two parts, hinged together as at 24, a fixed foot piece being indicated at 25 and a swinging outwardly projecting arm at 26. The arm 26 has a curvature similar to that of its co-acting member of the two-part yoke 16, and also a like terminating plate 27 having holes for the securing bolts 21, and a sleeve 28 fitting between and in alinement with the sleeves 22 to receive the pin 23, the latter having a hook 29 on one end, and being threaded on the other end for a nut 30.

Supposing the casing 13 and its thus far described parts to be assembled, but separated from a spoke 12 in order to attach it to the latter, the procedure is as follows: Unscrew the nut 30, withdraw the pin 23 from the sleeves 22, 28, and remove the bolts 21 from the plates 20, 27 so that the arm 26 may be swung away from the arm 17, and the yoke 16 passed around the spoke. Then reinsert the bolts 21 and tighten them to bind the two arms of the yoke firmly around the spoke, thus to hold the casing in place. Then replace the pin 23 in the sleeves 22, 28 and secure by the nut 30, the hook 29 being placed so as to extend toward the rim of the wheel.

In the axial line of the casing 13 is a fixed shaft 31 which, as shown, may have a head 32 fitting a countersunk hole in the head 14 of the casing. On the opposite end of the shaft is a nut 33 which is screwed up against the removable head 15, thus preventing the shaft 31 from turning. Rotatably mounted on said shaft 31 and within the casing is a hollow drum 34 formed with an external spiral flange 35 to guide a chain 36 when wound on the drum, one end of said chain being fastened to the drum. Within the drum 34 is a coiled spring 38 attached by one end to the drum as at 39, the other end being fastened at 40$^a$ to the fixed shaft 31.

The chain 36 may be heavy enough to pass around the tire 11 to prevent skidding or, if preferred, may be relatively light so as to wind more readily on the drum and connect with a heavier section 37 to form the tread or non-skid portion, this section ending in an eye or loop 38 adapted to engage the hook 29 and hold the chain in operative position.

A portion of the casing 13 next the rim 10 is cut out as at 39, thus furnishing an opening through which the chain may pass in and out of the casing. A collar 40 is mounted on the eye or loop 38 attached to the chain, said collar bearing on the casing 13 and holding the eye or loop conveniently exposed to be grasped by hand when the chain is to be withdrawn from the casing and placed in use.

In using this device, as many as are preferred or necessary are mounted on spokes of the selected wheel or wheels. Under normal road conditions the chains are not required in practice, and remain wound upon their drums, as in Fig. 3. When rain or snow falls and the roads become slippery or heavy, extra traction is needed; under which conditions the operator grasps the eye 38, withdraws the chains from the casings 13, places the chains over the tread surfaces of the tires, and attaches the eyes 38 to the hooks 29 of the respective casings on the wheel. The chains remain in the position shown in Figs. 1 and 2 until their use is no longer needed, when, upon disengaging the eyes from the hooks, the chains will automatically wind upon the drums and be housed until again required.

I claim:—

1. A non-slipping device for vehicle wheels comprising a spring-actuated drum and means for mounting the same on a spoke of a wheel, a chain attached to said drum and adapted to be normally wound thereon but capable of being unwound therefrom and placed across the tread surface of the wheel tire, and means for securing said chain in its latter position.

2. A non-slipping device for vehicle wheels comprising a spring-actuated drum and means for mounting the same on a spoke of a wheel, a chain attached to said drum and adapted to be normally wound thereon but capable of being unwound therefrom and placed across the tread surface of the wheel tire, and means, on the opposite side of the same spoke that supports said spring-actuated drum, for detachable connection with said chain.

3. A non-slipping device for vehicle wheels comprising a casing and means thereon for securing the same to a spoke of a wheel, a spring-actuated drum supported within said casing, a chain attached to said drum and adapted to be normally wound thereon but capable of unwinding and being placed across the tread surface of the wheel tire, and means on the spoke for detachably connecting the chain therewith.

4. A non-slipping device for vehicle wheels comprising a casing, means thereon for rigidly but removably mounting the casing on a spoke of a wheel, a spring-actuated drum supported within said casing, a chain attached at one end to said drum and adapted to be normally wound thereon but capable of unwinding and when distended of being placed across the tread surface of the wheel tire, a fastening means on the opposite end of said chain, and a coöperating fastening means on the drum support for engaging the fastening means on the chain to hold the latter in operative position.

5. A non-slipping device for vehicle wheels comprising a casing, a two-part separable yoke on the casing for removably mounting the same on a spoke of a wheel, a pin connecting said yoke parts having a hook on one end, a spring-actuated drum supported within said casing, a chain attached at one end to said drum adapted to be normally wound thereon but capable of unwinding and being placed across the tread surface of the wheel tire, and a fastening means on the free end of said chain for connecting it to the hook of said pin whereby said chain is held in operative position.

In testimony whereof I affix my signature.

ALFRED L. FORREST.